United States Patent
Shaffer et al.

(10) Patent No.: US 6,490,614 B1
(45) Date of Patent: Dec. 3, 2002

(54) SYSTEM AND METHOD FOR MULTIMEDIA MESSAGING SYSTEM COLLABORATION INCLUDING PROPOSAL APPROVAL

(75) Inventors: Shmuel Shaffer, Palo Alto; William Joseph Beyda, Cupertino, both of CA (US)

(73) Assignee: Siemens Information & Communications Networks, Inc., Boca Raton, FL (US)

(*) Notice: Subject to any disclaimer, the term of this patent is extended or adjusted under 35 U.S.C. 154(b) by 0 days.

(21) Appl. No.: 09/144,513

(22) Filed: Aug. 31, 1998

(51) Int. Cl.[7] .............................................. G06F 15/16
(52) U.S. Cl. ...................... 709/206; 709/204; 709/205; 709/212; 709/216; 709/238
(58) Field of Search ................................. 709/204–207, 709/212–213, 216, 227–229, 238

(56) References Cited

U.S. PATENT DOCUMENTS

| | | | |
|---|---|---|---|
| 5,285,203 A | | 2/1994 | Nakano ........................ 340/827 |
| 5,515,491 A | | 5/1996 | Bates et al. .................. 345/331 |
| 5,781,732 A | | 7/1998 | Adams ........................ 709/205 |
| 5,930,471 A | * | 7/1999 | Milewski et al. ........... 709/204 |
| 5,978,836 A | * | 11/1999 | Ouchi ........................ 709/206 |
| 6,105,055 A | * | 8/2000 | Pizano et al. ................ 709/204 |
| 6,167,434 A | * | 12/2000 | Pang ........................... 709/206 |

FOREIGN PATENT DOCUMENTS

EP   0 800 144 A2   10/1997   ............ G06F/17/60

OTHER PUBLICATIONS

European Search Report dated Nov. 19, 1999, EP application No. EP 99 11 4746.

* cited by examiner

Primary Examiner—Bharat Barot

(57) ABSTRACT

The present invention relates to a system and method for multimedia messaging system collaboration. According to an embodiment of the present invention, the sender sends a message to multiple recipients. A recipient wishing to make a comment or insert changes to the message submits his comments to a moderator for approval. If the moderator approves of the changes, then the changes are automatically incorporated into the message. The original message is then automatically recalled from recipients who have not yet opened the message and a revised message is automatically sent to those whose messages were recalled. Additionally, according to an embodiment of the present invention, a message is automatically sent to those recipients who have already opened the original message to indicate the change to the original message and update those recipients.

23 Claims, 5 Drawing Sheets

SYSTEM AND METHOD FOR MULTIMEDIA MESSAGING SYSTEM COLLABORATION INCLUDING PROPOSAL APPROVAL

BACKGROUND OF THE INVENTION

The present invention relates to electronic messaging systems. In particular, the present invention relates to multimedia message collaboration.

In addition to electronic mail (e-mail) and voice mail, today's electronic messaging systems may also include multimedia messages. A multimedia message is typically a message that includes more than one media. For example, a multimedia message may include text, video, audio, and images such as graphs and charts. In a multimedia messaging system, the ability to exchange e-mails, voicemails, faxes, images and video is part of a basic multimedia system. Examples of multimedia messaging systems include ViewMail, Phone Max, Repartee, and View Call Plus, all by Active Voice.

A sender may send a multimedia message to numerous recipients, several of whom may wish to make comments or revisions to the multimedia message. For example, a sender may send a multimedia message of a proposed presentation for a company. Some of the recipients of the message may wish to comment or revise portions of the message. Typically, if recipient A makes a comment or a revision to the message, recipient A would return the commented or revised message back to the sender. For example, assume an incorrect statement is made in the message and recipient A corrected the statement and returned it to the sender. In the meantime, recipients B through Z may also have noticed that the statement was incorrect, and most of them may correct the statement and return the corrected statement to the sender. Since recipients A–Z would each review the message in their own time, the sender may receive multiple comments regarding the same incorrect statement over a period of days.

Alternatively, a recipient of the multimedia message may feel compelled to forward his comments to all the recipients and sender for discussion and agreement. All responses to those comments are also likely to be sent to recipients and sender. Accordingly, it is likely that all recipients and sender have multiple messages with regard to the same issue. The cumulative time lost on the matter of a single message may be substantial.

It would be desirable to have a multimedia messaging system which collaborates comments and revisions while minimizing time wasted reading obsolete messages. SUMMARY OF THE INVENTION The present invention relates to a system and method for multimedia messaging system collaboration. According to an embodiment of the present invention, the sender sends a message to multiple recipients. A recipient wishing to make a comment or insert changes to the message submits his comments to a moderator for approval. If the moderator approves of the changes, then the changes are automatically incorporated into the message. The original message is then automatically recalled from recipients who have not yet opened the message and a revised message is automatically sent to those whose messages were recalled. Additionally, according to an embodiment of the present invention, a message is automatically sent to those recipients who have already opened the original message to indicate the change to the original message and update those recipients.

According to an embodiment of the present invention, a vote may also be called to determine whether a revision of the message should be accepted. If the vote accepts the change, then the revisions are automatically incorporated into the message and recipients who have not yet opened then original message will automatically have their original message recalled and automatically have an updated version of the message sent to them.

According to an embodiment of the invention, a method for collaboration of an electronic message is presented. The method includes receiving a proposal associated with an issued electronic message and determining whether the proposal is approved. The method also automatically recalls the electronic message from a recipient who has not yet opened the electronic message, wherein the automatic recalling of the electronic message is performed if the proposal is approved.

In another embodiment, the present invention provides a system for collaboration of an electronic message. The system includes a network interface configured to receive a proposal associated with an issued electronic message and a user interface configured to receive an instruction on whether the proposal is approved. The system also includes a processor coupled with the network interface, wherein the processor is configured to automatically recall the electronic message from a recipient who has not yet opened the electronic message if the proposal is approved.

These and other embodiments of the present invention are described in further detail below with reference to the following drawings.

DETAILED DESCRIPTION OF THE SPECIFIC EMBODIMENTS

A method and system for collaboration of a multimedia message is herein disclosed. Software written according to the present invention may be stored in some form of computer-readable medium, such as memory or CD-ROM, or transmitted over a network, and executed by a processor. The present invention applies generally to multimedia messaging systems (for example, an H.323 system).

Figure 1:
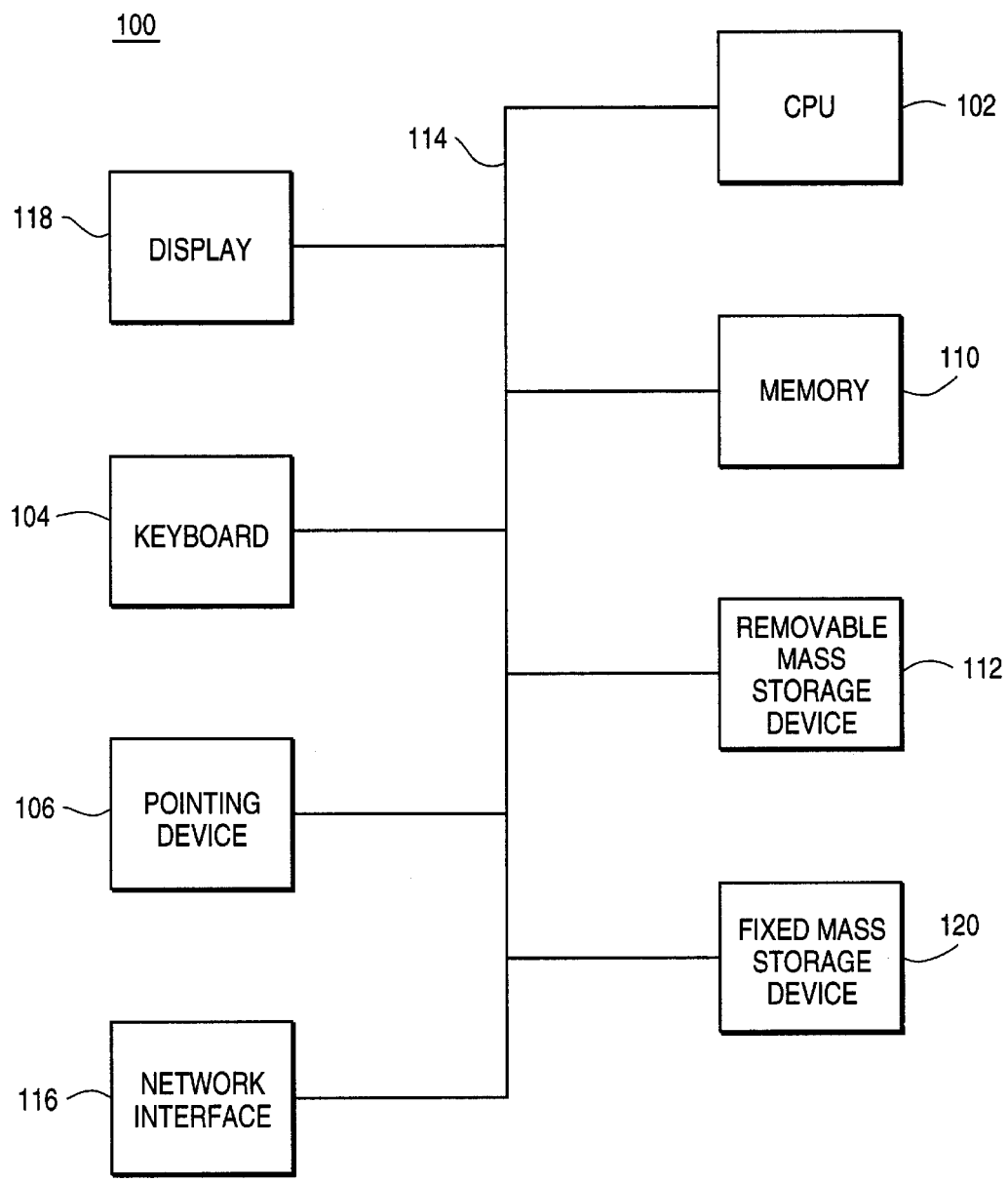
FIG. 1 is a block diagram of a computer system suitable for implementing an embodiment of the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by he CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, touchpad, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPV 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 2:
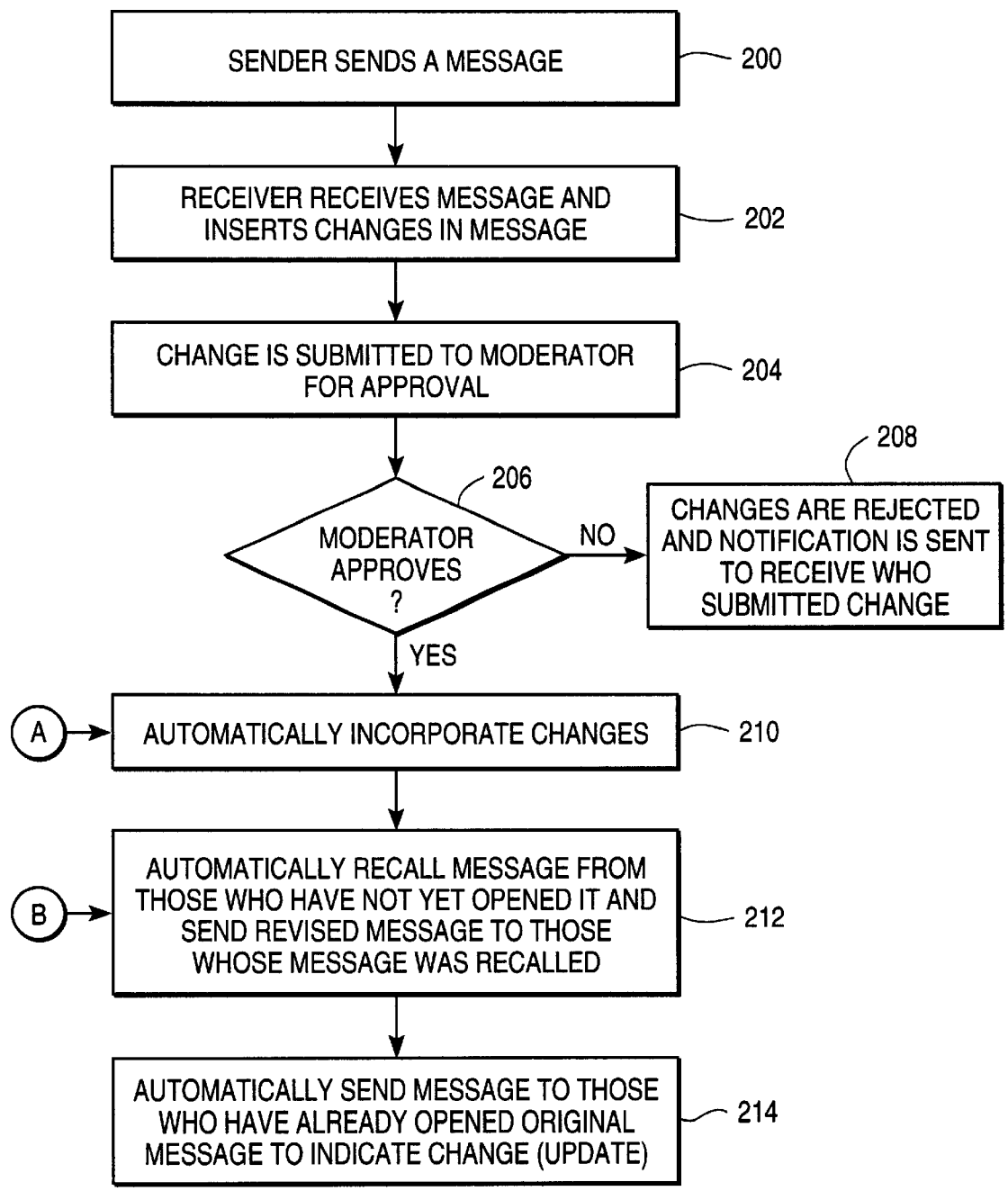
FIG. 2 is a block diagram of a flow diagram of a method according to an embodiment of the present invention for collaboration of a multimedia message.

FIG. 2 is a flow diagram of a method for collaborating on a multimedia message according to an embodiment of the present invention. A sender sends a multimedia message to numerous recipients (step 200). A receiver receives the message and inserts changes in the message (step 202). For exemplary purposes, it is assumed that the receiver inserts changes in the message, however, the receiver may make any proposal regarding the message. Examples of proposals include a change, comments, or appending the original message in various ways. For example, the receiver may append a voice message to the original message, insert an image, or generally make comments in video, audio, text, or any other media which may be used in the multimedia message.

The proposed change is then submitted to a moderator for approval (step 204). The moderator may be the sender or a third party, such as the manager of a project to which the multimedia message relates. It is then determined whether the moderator approves of the proposed change (step 206). If the moderator does not approve of the proposed change, then the change is rejected and not incorporated into the message (step 208). A notification of the rejection of the change, along with optional comments may be sent to the sender (if the sender is not the moderator) and the receiver who proposed the change (step 208). If, however, the moderator approves of the change, then the change is automatically incorporated into the message (step 210).

The original message is then automatically recalled from those recipients who have not yet opened the original message and a revised message is sent to those recipients whose message was recalled (step 212). An update message indicating the change to the original message is then automatically sent to those who have already opened the original message (step 214).

Figure 3:
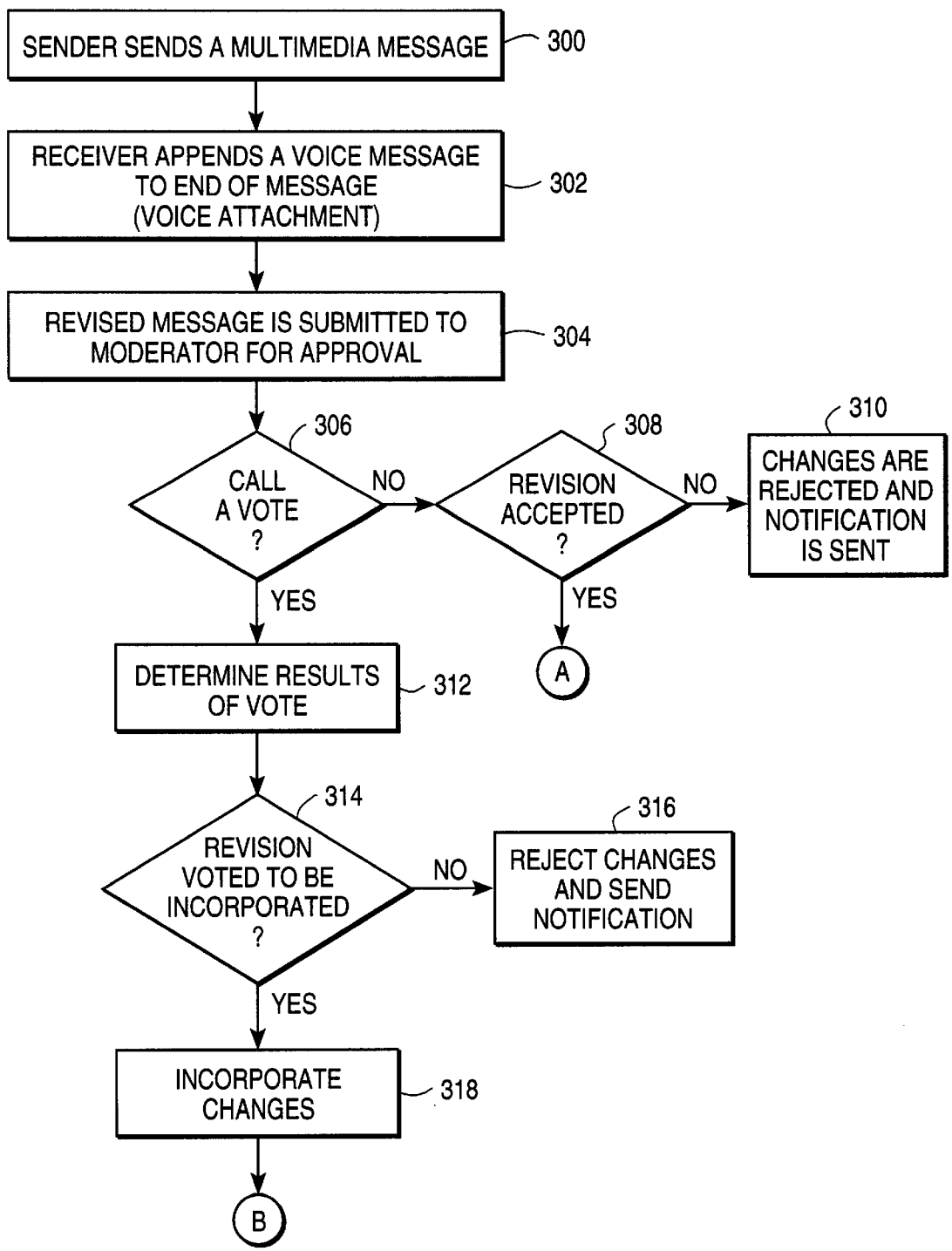
FIG. 3 is a method for collaboration of a multimedia message according to an embodiment of the present invention.

FIG. 3 is a flow diagram of a method for collaborating on a multimedia message, according to another embodiment of the present invention. A sender initially sends a multimedia message to numerous recipients (step 300). One of the recipients appends a voice message to the end of the original message as a voice attachment (step 302). Although a voice message is used in this example, any modification to the original message or comment regarding the original message may be authored by a recipient, as previously discussed in conjunction with FIG. 2.

The revised message is then submitted to a moderator for approval (step 304). As previously mentioned, the moderator may be the sender or any person selected to moderate this particular message.

It is then determined whether to call a vote (step 306). The vote may be called by any person or persons. For example, the vote may be called by the moderator, the sender, or the receiver who revised the message. If no vote is called, then it is determined whether the message revision is accepted by the moderator (step 308). If the revision is not accepted, the message revision is rejected (step 310). A notification of the rejection of the revision, along with optional comments may be sent to the sender (if the sender is not the moderator) and the receiver who proposed the revision (step 310). If, however, the message revision is accepted in step 308 then the revisions to the message are automatically incorporated in step 210 of FIG. 2. Thereafter, the original messages are automatically recalled from those recipients who have not yet opened the messages and a revised message is then sent to those whose message was recalled (step 212 of FIG. 2). A message updating those who have already opened their original message is also automatically sent (step 214 of FIG. 2).

If a vote is called in step 306 of FIG. 3, then the results of the vote are determined (step 312). Further details of the voting process will later be discussed in conjunction with FIG. 4. It is then determined whether the message revision has been voted to be incorporated into the message (step 314). If the revision was voted not to be incorporated, then the changes to the original message are rejected (step 316). A notification of the rejection of the change, along with optional comments may be sent to the sender (if the sender is not the moderator) and the receiver who proposed the change (step 316). If, however, the revision to the original message was voted to be incorporated in step 314, then the changes to the original message are incorporated (step 318). Thereafter, the system goes to step 212 of FIG. 2 wherein the original message is automatically recalled from those recipients who have not yet opened it and a revised message is sent to those whose message was recalled. A message is also automatically sent to those who have already opened the original message to update these recipients on the changes to the original document (step 214 of FIG. 2).

Figure 4:
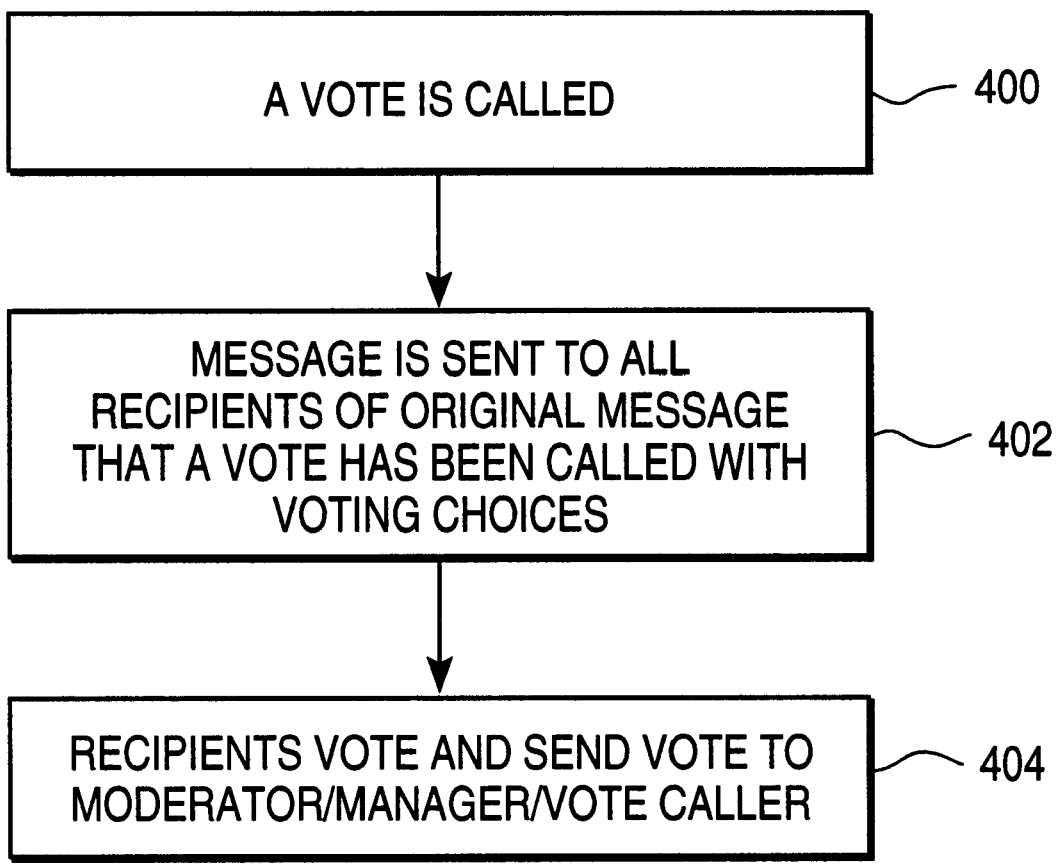
FIG. 4 is a flow diagram of a method for calling a vote according to an embodiment of the present invention.

FIG. 4 is a flow diagram of a method of voting, according to an embodiment of the present invention. The method shown in FIG. 4 is related to steps 306 and 312 of FIG. 3 wherein it is determined whether a vote is called, and if so determining the results of the vote. Examples of programs which may facilitate voting messages include Microsoft Outlook and Microsoft Exchange.

Initially, a vote is called (step 400). A message indicating that a vote has been called is sent to all recipients of the original message (step 402). This message indicating that a vote has been called should include voting choices. The recipients may then vote and send their vote to a predetermined individual, such as the moderator or the vote caller (step 404).

Figure 5:
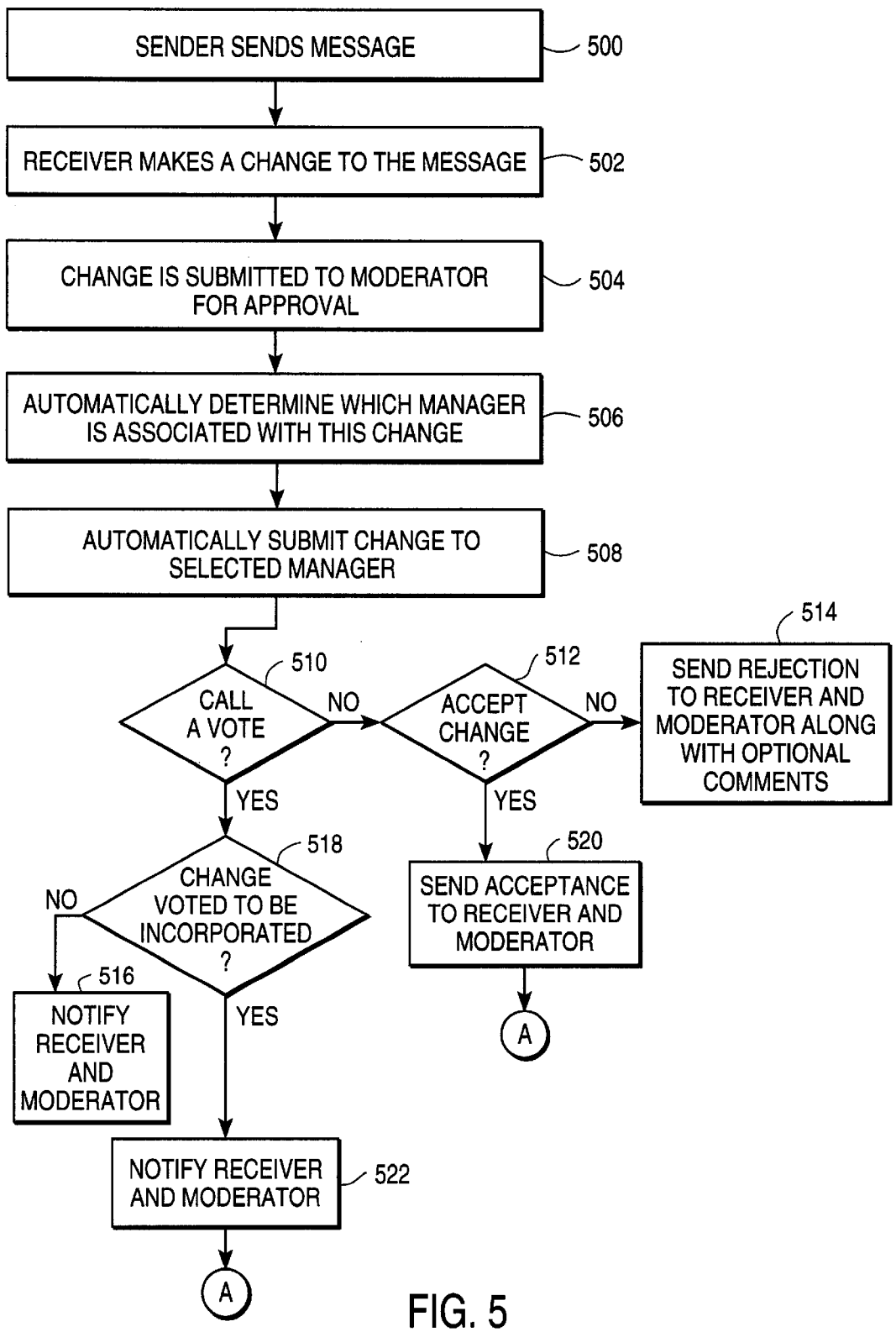
FIG. 5 is a flow diagram of a method for collaboration of a multimedia message according to an embodiment of the present invention.

FIG. 5 is a flow diagram of a method for collaboration of a multimedia message according to another embodiment of the present invention. In this embodiment, the multimedia message may have two or more people who manage the multimedia message. For example, in a group work environment, one employee may have generated the image portion of the multimedia message, such as graphs and charts, while another employee may have generated the audio portion of the multimedia message, such as narration and background music. Accordingly, the first employee may be designated as the manager for the image portion of the multimedia message, while the second employee is designated as the manager for the audio portion of the multimedia message.

A sender, such as a group secretary, sends the original multimedia message to multiple recipients (step 500). One of the receivers makes a change to the message (step 502). The change is then submitted to a moderator, such as the group supervisor, for approval (step 504). When the receiver submits the change to the moderator, the receiver may have the option to identify what portion of the message he is making a change or comment to. For example, if the message has a manager for images and another manager for audio, then a comments/change form may be sent along with the message wherein the receiver may select a portion of the message, such as image or audio, to which he is making his comments/changes. It is then automatically determined which manager is associated with this particular change (step 506). For example, if the proposed change is related to the audio portion of the multimedia message then the manager responsible for the audio portion will automatically be determined.

If the receiver proposing the change does not identify the portion of the message to which his change applies, then the proposal may be submitted to the moderator who can identify which portion of the message is related to the change. Alternatively, the moderator may directly identify the manager responsible for the portion of the message related to the change.

The proposed change is then automatically submitted to the responsible manager (step 508). Thereafter, either the method exemplified in FIG. 3, wherein a vote may be called, or the method exemplified in FIG. 2 may be utilized. For illustrative purposes, the flow diagram of FIG. 5 shows that a vote may be called. Accordingly, it is then determined whether to call a vote (step 510). If a vote is not called, then it is determined by the selected manager whether to accept this proposed change (step 512). If the proposed change is not accepted, then a rejection is sent to the receiver who proposed the change and the moderator, along with optional comments (step 514).

If, however, the manager decides to accept the proposed change in step 512, then an acceptance of the proposed change is sent to the receiver who proposed the change and the moderator (step 520). Thereafter, the system proceeds to step 210 of FIG. 2, wherein the changes are automatically incorporated.

If a vote is called in step 510, then it is determined whether the proposed change has been voted to be incorporated into the multimedia message (step 518). If the vote is against incorporating the change, then the receiver who proposed the change and the moderator are notified that the change has been voted not to be incorporated (step 516). If, however, the result of the vote is to incorporate the change, then the receiver who proposed the change and the moderator are then notified that the change is to be incorporated into the multimedia message (step 522). Thereafter, the system proceeds to step 210 of FIG. 2, wherein the change is automatically incorporated into the multimedia message.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for collaboration of an electronic message, wherein the electronic message is sent to a plurality of recipients, the method comprising the steps of:
    receiving a proposal associated with an issued electronic message from one or more recipients;
    submitting the proposal to a moderator for approval or non-approval;
    determining whether the proposal is approved; and
    automatically recalling the electronic message from a recipient who has not yet opened the electronic message, wherein the automatic recalling of the electronic message is performed if the proposal is approved.

2. The method of claim 1, wherein the electronic message is a multimedia message.

3. The method of claim 1, wherein the electronic message includes an image.

4. The method of claim 1, wherein the electronic message includes video.

5. The method of claim 1, wherein the electronic message includes text.

6. The method of claim 1, wherein the electronic message includes audio.

7. The method of claim 1, wherein a manager is responsible for a portion of the electronic message, and approval of the proposal includes approval by the manager.

8. The method of claim 1, further comprising automatically incorporating the proposal into the electronic message if the proposal is approved.

9. The method of claim 1, further comprising automatically sending a second electronic message incorporating the proposal to the recipient, wherein the automatic sending of the second electronic message is performed if the proposal is approved.

10. The method of claim 1, wherein the electronic message is hereinafter referred to as first electronic message, wherein the method further comprises sending a second electronic message to a second recipient, wherein the second recipient has already opened the first electronic message, and wherein sending the second electronic message is performed if the proposal is approved.

11. The method of claim 10, wherein the second electronic message indicates incorporation of the proposal into the electronic message.

12. The method of claim 1, wherein determining whether the proposal is approved includes a vote.

13. The method of claim 1, wherein the determination of whether the proposal is approved includes automatically determining a manager associated with the proposal.

14. A system for collaboration of an electronic message, wherein the electronic message is sent to a plurality of recipients, the system comprising:
    a network interface configured to receive from one or more recipients a proposal associated with an issued electronic message;
    a processor coupled with the network interface, wherein the processor is configured to submit the proposal to a moderator for approval or non-approval; and
    a user interface configured to receive an instruction on whether the proposal is approved;
    wherein the processor is configured to automatically recall the electronic message from a recipient who has not yet opened the electronic message if the proposal is approved.

15. The system of claim 14, wherein the electronic message is a multimedia message.

16. The system of claim 14, wherein the proposal, if approved, is approved by a moderator.

17. The system of claim 14, wherein the proposal, if approved, is approved by a manager, wherein the manager is responsible for a portion of the electronic message.

18. The system of claim 14, wherein the processor is configured to automatically incorporate the proposal into the electronic message if the proposal is approved.

19. The system of claim 14, wherein the processor is configured to automatically send a second electronic message incorporating the proposal to the recipient, wherein the automatic sending of the second electronic message is performed if the proposal is approved.

20. The system of claim 14, wherein the electronic message is hereinafter referred to as first electronic message, wherein the processor is configured to send a second electronic message to a second recipient, wherein the second recipient has already opened the first electronic message, and wherein sending the second electronic message is performed if the proposal is approved.

21. The system of claim 14 wherein a vote determines whether the proposal is approved.

22. A computer program product for collaboration of an electroni message, wherein the electronic message is sent to a plurality of recipients, the computer program product comprising:
    computer code receiving from one or more recipients a proposal associated with an issued electronic message;
    computer code submitting the proposal to a moderator for approval or non-approval;
    computer code determining whether the proposal is approved;
    computer code automatically recalling the electronic message from a recipient who has not yet opened the electronic message, wherein the automatic recalling of the electronic message is performed if the proposal is approved; and
    a computer readable medium that stores the computer codes.

23. The computer program product of claim 22, wherein the computer readable medium is selected from the group consisting of CD-ROM, floppy disk, tape, flash memory, system memory, hard drive, and data signal embodied in a carrier wave.

* * * * *